United States Patent [19]
Day

[11] 3,987,709
[45] Oct. 26, 1976

[54] PISTON
[76] Inventor: Ray E. Day, 340 Lakeland, Grosse Pointe, Mich. 48236
[22] Filed: Apr. 7, 1975
[21] Appl. No.: 565,767

[52] U.S. Cl. .................................. 92/232; 92/237
[51] Int. Cl.² .......................................... F16J 1/04
[58] Field of Search ............................ 92/232, 237

[56] References Cited
UNITED STATES PATENTS

| | | | |
|---|---|---|---|
| 1,727,647 | 9/1929 | Jardine | 92/232 X |
| 2,066,613 | 1/1937 | Day | 92/237 X |
| 2,120,090 | 6/1938 | Day | 92/232 |
| 2,141,784 | 12/1938 | Day | 92/237 X |
| 2,802,707 | 8/1957 | Day | 92/232 |
| 2,802,708 | 8/1957 | Day | 92/232 X |

*Primary Examiner*—Irwin C. Cohen
*Attorney, Agent, or Firm*—Whittemore, Hulbert & Belknap

[57] ABSTRACT

A piston comprising a head, a pair of opposed boss-carrying elements depending from the head and a pair of opposed skirt portions separated from each other and from the head. The skirt sections are supported from the boss-carrying elements by upper and lower pairs of struts each joined at one end to an adjacent skirt section and at the other end to an adjacent boss-carrying element. The end portions of each strut of the lower pair form an angle of between about 90° and 180°. The end portions of each strut of the upper pair form a substantially smaller angle than the end portions of the struts of the lower pair. The lower struts are stiffer than the upper struts.

3 Claims, 7 Drawing Figures

PISTON

BACKGROUND AND SUMMARY OF THE INVENTION

This invention relates to pistons for internal combustion engines.

The piston of this invention is of the type having flexible skirt portions and is an improvement on my earlier U.S. Pat. No. 2,802,707. As stated in my patent, some of the reasons for providing skirt sections which are flexible are to afford substantially uniform pressure and bearing engagement throughout the skirt bearing areas, to reduce skirt friction, to avoid scoring, to compensate for expansion and to avoid seizing. The piston disclosed in my patent had upper and lower struts which supported the skirt sections and which were reversely curved to an acute angle. These struts provided flexibility and at the same time provided a degree of stiffness to withstand side thrusts imposed by the motion of the connecting rod and to compensate to some extent for the rocking forces which develop during high speed engine operation. These rocking forces are concentrated at the top and bottom of the skirt sections.

One of the objects of the present invention is to deal more effectively with these rocking forces, that is to more effectively resist such forces while still retaining enough flexibility in the support of the skirt sections to reduce skirt friction, compensate for expansion and generally serve the purposes of flexibility referred to above. I have found that the rocking forces on the piston are concentrated with greater intensity at the bottom than at the top of the skirt sections and accordingly I now employ struts for the lower end portion of the skirt sections which are bent to a substantially larger angle than is shown in my patent. This substantially larger angle may be in the range of about 90° to 180° and sufficiently stiffens the lower end of the skirt sections to resist the rocking forces which develop during high speed operation. A substantially straight or 180° angle would ordinarily be suitable only in an extra long skirt section and of course would allow very little flexibility at the lower end of the skirt sections.

The struts supporting the upper portion of the skirt sections in my improved construction retain substantially the same degree of curvature as shown in my patent. The greater flexibility provided by these upper struts is sufficient to make the skirt sections as a whole sufficiently flexible for the purposes intended and yet provide enough stiffness to withstand the lesser concentration of forces at the top of the skirt sections which develop due to rocking.

Reference is now made to the drawings which disclose preferred embodiments of my invention wherein.

Figure 1:
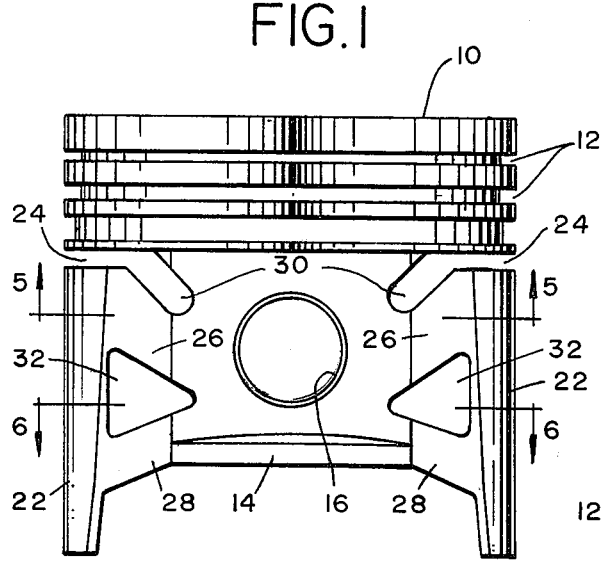
FIG. 1 is a side elevational view of a piston constructed in accordance with my invention, looking in the direction of one of the boss-carrying elements.
Figure 2:
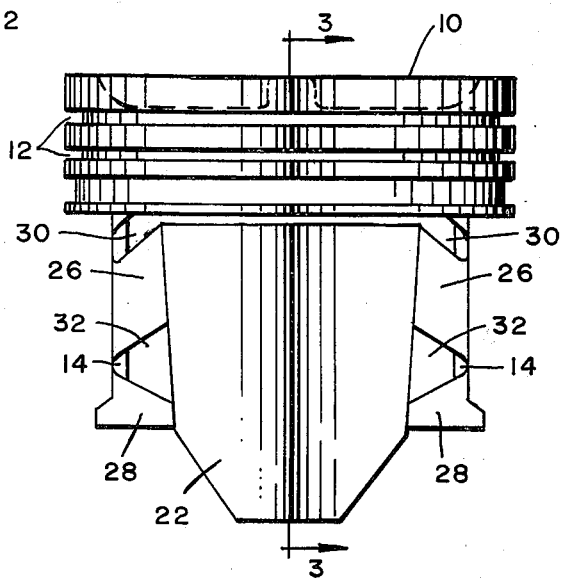
FIG. 2 is also a side elevational view but looking in the direction of one of the skirt sections.
Figure 3:
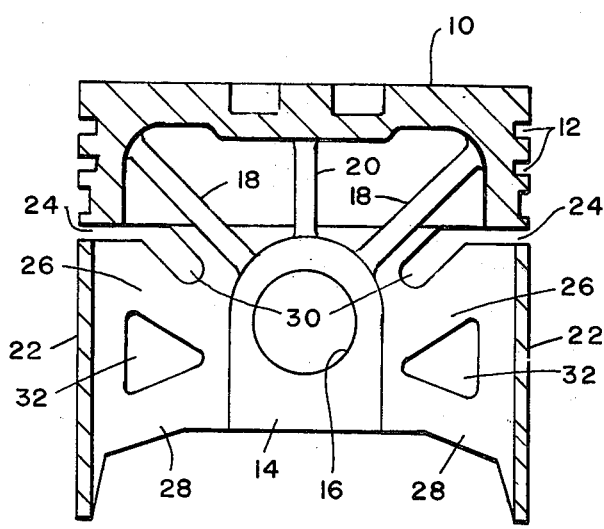
FIG. 3 is a sectional view taken on the line 3—3 in FIG. 2.
Figure 4:
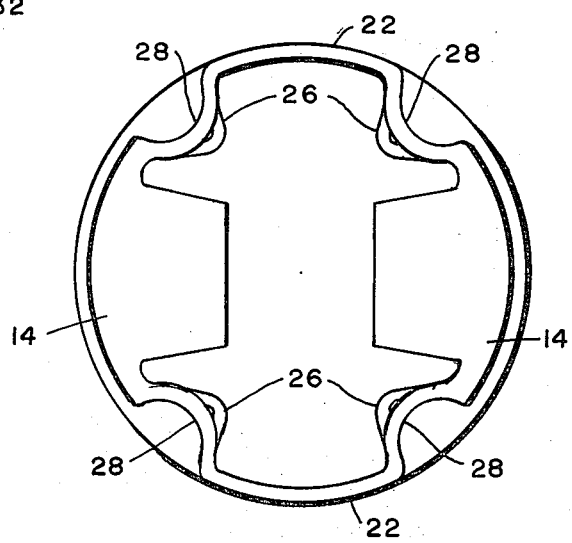
FIG. 4 is a bottom plan view.
Figure 5:
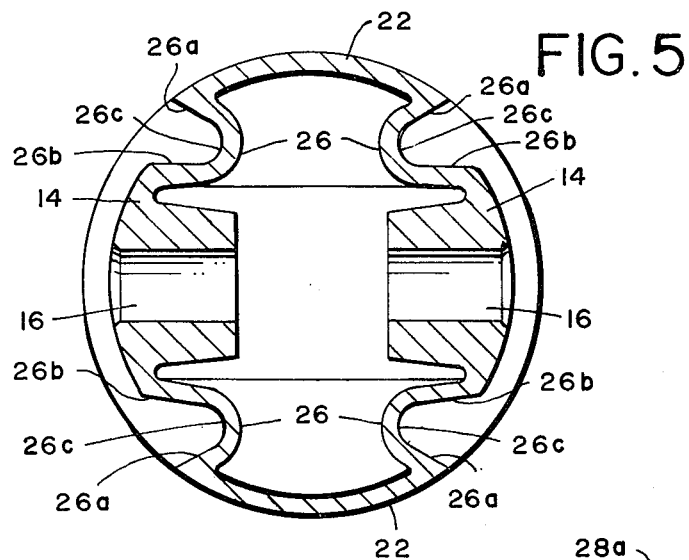
FIG. 5 is a sectional view taken on the line 5—5 in FIG. 1.

Referring now more particularly to the drawings and especially to FIGS. 1 to 6, the piston there shown comprises a circular head 10 provided with ring grooves 12 for the reception of the customary piston rings. Depending integrally from the head 10 at opposite sides thereof are a pair of boss supports or hanger members 14 carrying aligned pin bosses or bearings 16. Each depending boss support 14 is reinforced or stiffened by an outer pair of downwardly converging ribs 18 and a central vertical rib 20. These ribs extend at their upper ends into the head 10 and at their lower ends into the bosses 16.

The piston skirt comprises a pair of separate, opposed, arcuate skirt sections or thrust bearing slipper members 22. Each skirt section 22 is separated from the head by means of a through slot 24, thereby providing a construction in which the skirt sections are arranged at opposite sides of the bosses in separated relation to each other and to the head and, as a consequence, are supported only from the depending boss supports 14.

The supporting means for each skirt section 22 comprises an upper pair of struts 26 and a lower pair of struts 28.

The upper struts 26 are reversely curved and in effect provide a gooseneck construction. One end of each upper strut 26 originates at the adjacent outer edge of the skirt section at the top or upper end thereof and the upper edge of the strut lies at least in part above the boss. Each upper strut from its upper end at the top edge portion of the skirt section angles or slants inwardly and downwardly toward the center of the boss support and substantially at this location the opposite end of the strut integrally joins the boss support at a point well below the opposite upper end of the strut. Thus it will be seen that the opposed skirt sections are joined at each side to one of the boss supports by means of downwardly converging upper struts 26 which join the edges of the skirt sections in the extreme upper ends thereof.

The upper struts 26 for each skirt section are similar in form and comprise like inwardly curving or converging relatively short end portions 26a extending from the opposite edges of the skirt section. These struts 26 also comprise outwardly directed relatively longer diverging end portions 26b joined at their ends to the boss supports. The reversely curved portions 26a and 26b of each upper strut 26 are joined by means of a curved bend or bowed portion 26c which is preferably disposed opposite the inner end of the adjacent piston pin boss. The angle formed between the end portions 26a and 26b by the intermediate bowed portion 26c is an acute angle and preferably substantially less than 90°. In the present instance the angle is shown as being on the order of about 30°. The upper struts 26 on each side of the bosses are flexible and flexibly support the upper ends of the skirt sections on the boss supports 14 at points well below the head of the piston and at about the level of the bosses 16.

Figure 6:
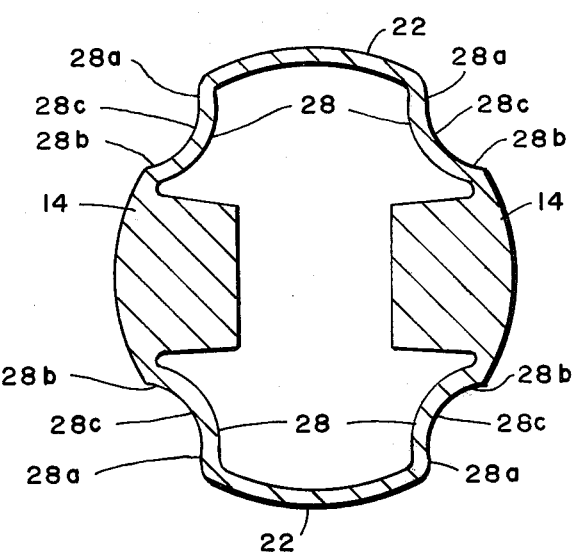
FIG. 6 is a sectional view taken on the line 6—6 in FIG. 1.

The lower struts 28 as shown in FIG. 6 are reversely curved but to a lesser degree than the upper struts and hence are less flexible or stiffer than the upper struts. One end of each lower strut 28 originates at the adjacent outer edge of the skirt section near the bottom or lower end thereof at a point below the boss 16. Each lower strut 28 from its end joined to the skirt section angles or slants inwardly and upwardly toward the boss support 14 where its other end integrally joins the lower end portion of the boss support below the boss 16.

The lower struts 28 are similar in form and comprise like inwardly curving or converging end portions 28a extending from the opposite edges of the skirt section. These struts 28 also comprise outwardly directed or diverging end portions 28b joined at their ends to the boss supports. The end portions of each lower strut 28 are joined by means of a curved bend or bowed central portion 26c. Actually, the portions 28a, 28b and 28c extend in a continuous curve of more or less uniform radius. The angle formed between the end portions 28a and 28b by the intermediate bowed portion 28c is in the present instance about 90°. This angle should be an obtuse angle and the permissible range extends from about 90° to 180°, larger angles of course proportionately increasing the stiffness of the support provided by the struts 28 for the lower end portion of the skirt sections.

The upper struts 26 are separated from the head as well as the boss supports 14 by means of the angularly related downwardly converging slots 30 which extend from the slots 24 as shown. Also it will be seen that the struts 26 and 28 of each pair are separated throughout their major length by means of relatively large openings 32.

Figure 7:
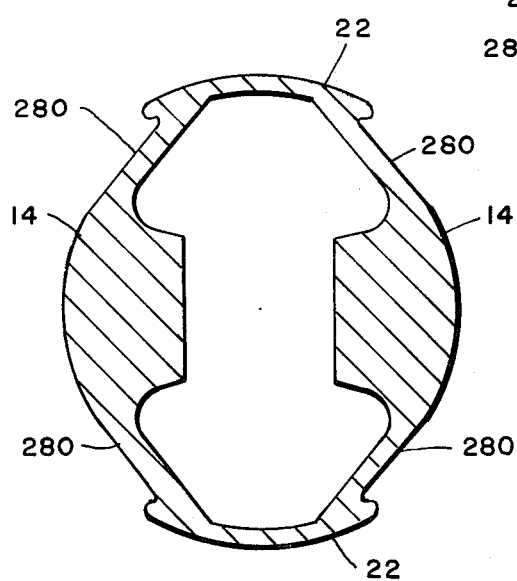
FIG. 7 is a view similar to FIG. 6 but showing a modification.

FIG. 7 is similar to FIG. 6 but shows a modified construction in which the lower struts 280 are substantially straight or 180°. Straight lower struts allow very little give and provide an extremely stiff support for the lower end portion of the skirt sections and are not recommended except in pistons having exceptionally long skirt sections. Otherwise the piston shown in FIG. 7 may be like that in FIGS. 1–6.

What I claim as my invention is:

1. A one piece piston formed from a single material comprising a head, a pair of opposed boss-carrying supports depending from two opposite sides of said head, a pair of opposed skirt sections beneath said head at the remaining two opposite sides thereof and separated from each other and from said head, and strut means supporting said skirt sections from said supports, said strut means comprising a first upper pair of struts each joined at one end to the upper end of one skirt section and at the opposite end to the adjacent support, a second upper pair of struts each joined at one end to the upper end of the other skirt section and at the opposite end to the adjacent support, said first and second upper pairs of struts slanting downwardly from the skirt section to the support, a first lower pair of struts each joined at one end to the lower end of said one skirt section and at the opposite end to the adjacent support, a second lower pair of struts each joined at one end to the lower end of said other skirt section and at the opposite end to the adjacent support, said first and second lower pairs of struts slanting upwardly from the skirt section to the support, the struts of said first and second upper pairs being bent to an acute angle opening radially outwardly so as to be flexible and thus to flexibly support the upper end of said skirt sections from said boss-carrying supports, and the struts of said first and second lower pairs being bent to an angle of 90° or more opening radially outwardly so as to be less flexible than the struts of said first and second upper pairs and to less flexibly support the lower ends of said skirt sections from said boss-carrying supports.

2. The piston defined in claim 1, wherein the struts of said first and second upper pairs are bent to an angle of about 30° and the struts of said first and second lower pairs are bent to an angle of about 90°.

3. The piston defined in claim 1, wherein the struts of said first and second upper pairs are bent to an angle of about 30° and the struts of said first and second lower pairs are disposed at an angle of about 180°.

* * * * *